(12) United States Patent
Lee et al.

(10) Patent No.: US 10,359,830 B2
(45) Date of Patent: Jul. 23, 2019

(54) OPTICAL TOUCH INPUT DEVICE AND DRIVING METHOD THEREOF

(75) Inventors: Young-Joon Lee, Goyang-si (KR);
Won-Suk Lee, Yongin-si (KR);
Hyun-Woo Jang, Seoul (KR)

(73) Assignee: LG DISPLAY CO., LTD, Seoul (KR)

( * ) Notice: Subject to any disclaimer, the term of this patent is extended or adjusted under 35 U.S.C. 154(b) by 420 days.

(21) Appl. No.: 13/323,257

(22) Filed: Dec. 12, 2011

(65) Prior Publication Data
US 2012/0154336 A1  Jun. 21, 2012

(30) Foreign Application Priority Data

Dec. 16, 2010 (KR) .................... 10-2010-0129532

(51) Int. Cl.
*G06F 3/042* (2006.01)
*G06F 1/3234* (2019.01)
*G06F 1/3296* (2019.01)

(52) U.S. Cl.
CPC .......... *G06F 1/3259* (2013.01); *G06F 1/3296* (2013.01); *G06F 3/0428* (2013.01); *Y02D 10/155* (2018.01); *Y02D 10/172* (2018.01); *Y02D 50/20* (2018.01)

(58) Field of Classification Search
None
See application file for complete search history.

(56) References Cited

U.S. PATENT DOCUMENTS

| | | | |
|---|---|---|---|
| 4,737,626 A | 4/1988 | Hasegawa | |
| 4,761,550 A | 8/1988 | Hasegawa | |
| 6,351,260 B1 * | 2/2002 | Graham | G02B 6/32 |
| | | | 345/104 |

(Continued)

FOREIGN PATENT DOCUMENTS

| | | |
|---|---|---|
| CN | 101025519 A | 8/2007 |
| CN | 201233592 Y | 5/2009 |

(Continued)

OTHER PUBLICATIONS

Office Action issued in corresponding United Kingdom Patent Application No. GB 1121684.3, dated Sep. 16, 2013, 3 pages.

(Continued)

*Primary Examiner* — Patrick N Edouard
*Assistant Examiner* — Douglas M Wilson
(74) *Attorney, Agent, or Firm* — Seed IP Law Group LLP

(57) ABSTRACT

Disclosed are an optical touch input device which divisionally adjusts optical output of a light emitting unit before and during a touch operation to reduce power consumption, and a driving method thereof, the optical touch input device includes a display panel, a plurality of infrared light emitting elements disposed on two adjacent sides of the display panel, a lens unit disposed on the remaining two adjacent sides of the display panel and reflecting light emitted from the infrared light emitting elements, a light receiving unit disposed on the two adjacent sides of the display panel, and a touch control unit including a touch coordinate calculation unit to calculate a set of coordinates of a touch point and a light emission control unit to divide optical outputs of the infrared light emitting elements into optical output during touch and optical output during non-touch and to lower the optical output during non-touch.

10 Claims, 10 Drawing Sheets

(56) References Cited

U.S. PATENT DOCUMENTS

| | | | |
|---|---|---|---|
| 6,836,367 B2 | 12/2004 | Seino et al. | |
| 8,200,051 B2* | 6/2012 | Khan | G02B 6/1221 345/175 |
| 8,537,137 B2* | 9/2013 | Kinugasa | G06F 1/3203 345/175 |
| 2002/0080631 A1* | 6/2002 | Kanouda | H02M 3/156 363/62 |
| 2003/0057888 A1* | 3/2003 | Archenhold | H05B 33/0818 315/291 |
| 2006/0049800 A1* | 3/2006 | Reed | H02M 3/1588 320/128 |
| 2006/0237636 A1* | 10/2006 | Lyons | F21K 9/00 250/228 |
| 2007/0052693 A1* | 3/2007 | Watari | G06F 3/0421 345/175 |
| 2008/0062150 A1* | 3/2008 | Lee | G06F 3/0416 345/175 |
| 2008/0278460 A1 | 11/2008 | Arnett et al. | |
| 2009/0219261 A1* | 9/2009 | Jacobson | G06F 3/0412 345/175 |
| 2009/0237375 A1* | 9/2009 | Khan | G02B 6/1221 345/175 |
| 2010/0097009 A1* | 4/2010 | Lin | H05B 33/0851 315/297 |
| 2010/0134447 A1* | 6/2010 | Nakajoh | G06F 3/0421 345/175 |
| 2011/0080110 A1* | 4/2011 | Nuhfer | H05B 33/0815 315/291 |
| 2011/0115757 A1* | 5/2011 | Kim | G06F 3/042 345/204 |
| 2012/0086701 A1* | 4/2012 | Vaananen | H05B 33/0848 345/214 |
| 2012/0162142 A1* | 6/2012 | Christiansson | G06F 3/0421 345/175 |
| 2012/0262424 A1* | 10/2012 | Tanaka | G06F 3/0412 345/175 |

FOREIGN PATENT DOCUMENTS

| | | |
|---|---|---|
| CN | 101546239 A | 9/2009 |
| DE | 3604729 A1 | 8/1986 |
| EP | 0374767 A1 | 12/1989 |
| GB | 2171195 A | 8/1986 |
| JP | H02-259487 | 10/1990 |
| JP | H03-055846 | 3/1991 |
| JP | H0355846 B2 | 8/1991 |
| JP | 4005717 A | 1/1992 |
| JP | H09-152932 | 6/1997 |
| JP | 2980286 B2 | 11/1999 |
| JP | 2004-127072 | 4/2004 |
| JP | 2004-318258 | 11/2004 |
| JP | 2007-010645 | 1/2007 |
| JP | 2007-163891 | 6/2007 |
| JP | 2009-072229 | 4/2009 |
| JP | 2009-230761 | 10/2009 |
| JP | 2010527100 A | 8/2010 |
| KR | 1020090101843 A | 9/2009 |
| KR | 1020100012367 A | 2/2010 |
| WO | WO 01/40922 A2 | 6/2001 |
| WO | WO 2011/028170 A1 | 3/2011 |

OTHER PUBLICATIONS

Office Action issued in corresponding United Kingdom Patent Application No. GB1121684.3, dated Apr. 10, 2012.

Office Action issued in corresponding Korean Patent Application No. 10-2010-0129532, dated Apr. 26, 2013.

Office Action issued in corresponding Chinese Patent Application No. 201110434218.4, dated Jan. 6, 2014, 21 pages.

Office Action issued in corresponding German Patent Application No. 102011056423.3, dated Feb. 12, 2014, 12 pages.

* cited by examiner

OPTICAL TOUCH INPUT DEVICE AND DRIVING METHOD THEREOF

This application claims the benefit of Korean Patent Application No. 10-2010-0129532, filed on Dec. 16, 2010, which is hereby incorporated by reference as if fully set forth herein.

BACKGROUND

Field of the Disclosure

The present disclosure relates to an optical touch input device, and more particularly, to an optical touch input device which divisionally adjusts optical output of a light emitting unit before a touch operation and during the touch operation to reduce power consumption, and a driving method thereof.

Discussion of the Related Art

In general, a touchscreen is one of various devices which form an interface between information communication equipment using various displays and a user, and is an input device in which a user interfaces with equipment by directly contacting a screen using a hand or a pen.

The touchscreen is conversationally and intuitionally manipulated only through contact between a finger and a button displayed on a display and thus is easily used by people of all ages and both sexes, thus being recently applied to various fields, such as issuing machines in banks or public offices, various medical equipment, guide systems in tourist facilities and main government organizations, traffic guide systems, etc.

Such touchscreens are divided into a resistive type, a capacitive type, an ultrasonic wave type, an infrared type, etc., according to recognition methods employed.

Advantages of the above-described types are different, but an infrared type touchscreen minimizes pressure applied to a touch surface and has convenience in arrangement, thus recently attracting attention.

Infrared type touchscreens may be divided into an infrared matrix type, an infrared camera sensing type, etc., according arrangement structures of light emitting sources and light receiving sources and the numbers thereof.

A specific type may be preferred according to size of a display panel and whether or not it moves during assembly, and from among them, an infrared matrix type touchscreen includes a plurality of infrared light emitting sources and one image sensor.

However, in the case of the above-described infrared type touchscreen, the infrared light emitting sources continuously emit light even if touch input does not occur for a long time, and thus the infrared light emitting sources and the image sensor are operated even if touch does not actually occur, thus consuming unnecessary power. Thereby, the lifespan of the infrared light emitting sources is reduced due to unnecessary power consumption and thus causes a high power consumption rate.

Further, the lifespan of the infrared light emitting sources from among elements necessary for a display device is relatively shortened due to cyclic lighting of the infrared light emitting sources necessary for touch sensing, and thus accuracy in touch detection is lowered when the display device is used for a long time.

The above-described conventional infrared type touchscreen has problems, as follows.

The infrared light emitting sources continuously maintain the lighting state before or after touch driving, and unnecessary power is consumed even if touch does not occur or in a region in which touch does not occur.

Therefore, the lifespan of the infrared light emitting sources tends to be shortened due to increase in power consumption unnecessary during non-touch.

SUMMARY

An optical touch input device includes a display panel, a plurality of infrared light emitting elements disposed on two adjacent sides of the display panel, a lens unit disposed on the remaining two adjacent sides of the display panel and reflecting light emitted from the plurality of infrared light emitting elements, a light receiving unit disposed on the two adjacent sides of the display panel, and a touch control unit including a touch coordinate calculation unit to calculate a set of coordinates of a touch point according to data regarding light received by the light receiving unit and a light emission control unit to divide optical outputs of the plurality of infrared light emitting elements into optical output during touch and optical output during non-touch and to lower the optical output during non-touch as compared to the optical output during touch.

In another aspect of the present invention, in a driving method of an optical touch input device, optical output of a plurality of infrared light emitting elements disposed on two adjacent sides of a display panel during non-touch is lower than optical output of the plurality of infrared light emitting elements during touch.

In another aspect of the present invention, a driving method of an optical touch input device includes a first step of detecting whether or not touch occurs using a sensor unit provided on two adjacent sides of a display panel, and a second step of switching a plurality of infrared light emitting elements provided on the two adjacent sides of the display panel to a low power mode in which optical output of the plurality of infrared light emitting elements is lowered, if touch does not occur in the first step.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an optical touch input device and a driving method thereof in accordance with the present invention will be described in more detail with reference to the accompanying drawings.

Figure 1:
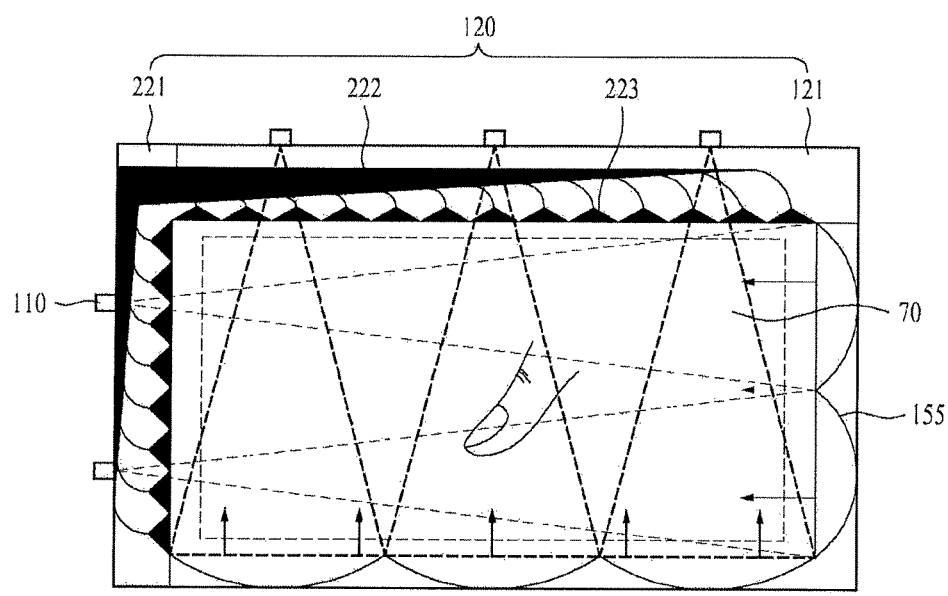
FIG. 1 is a plan view illustrating an example of an optical touch input device in accordance with an embodiment of the present invention.
Figure 2:
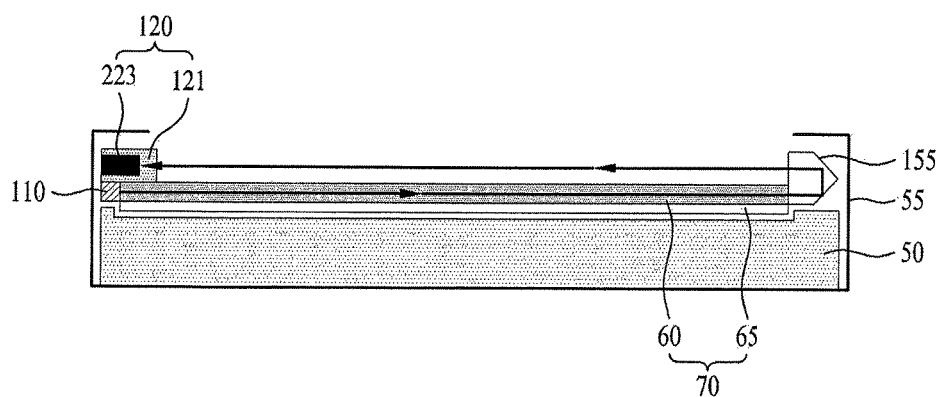
FIG. 2 is a sectional view of a light emitting unit of FIG. 1 in the lengthwise direction or in the widthwise direction.

FIG. 1 is a plan view illustrating an example of an optical touch input device in accordance with the present invention, and FIG. 2 is a sectional view of a light emitting unit of FIG. 1 in the lengthwise direction or in the widthwise direction.

The optical touch input device in accordance with the present invention is of an infrared matrix type in which light emitting elements attached to one side surface of a display panel emit light to side surfaces of the panel and an image sensor opposite thereto receives the light. Here, touch is recognized according to an amount of the light received.

As shown in FIG. 1, the optical touch input device includes a display panel 70, a plurality of infrared light emitting elements 110 disposed on two adjacent sides of the display panel 70, a lens unit 155 disposed on the remaining two adjacent sides of the display panel 70 and reflecting light emitted from the infrared light emitting elements 110, a light receiving unit 120 disposed on the two adjacent sides of the display panel 70, and a touch control unit 180 including a touch coordinate calculation unit 130 (with reference to FIG. 3) to calculate a set of coordinates of a touch point according to data regarding light received by the light receiving unit 120 and a light emission control unit 112 (with reference to FIG. 3) which divides optical outputs of the infrared light emitting elements 110 into optical output during touch and optical output during non-touch to lower the optical output during non-touch as compared to the optical output during touch.

The infrared light emitting elements 110 may be, for example, infrared LEDs (IR LEDs).

Here, the light receiving unit 120 collects infrared light emitted from the infrared light emitting elements 110 and then reflected by the lens unit 155.

The light receiving unit 120 includes an image sensor 221, a plurality of optical fibers 222, each of which is provided with one end connected to the image sensor 221, a plurality of in-plane lenses 223 to which the other end of each of the plural optical fibers 222 is connected, and an optical waveguide 121 in which the image sensor 221, the plural optical fibers 222 and the plural in-plane lenses 223 are installed.

The in-plane lenses 223 correspond to a plurality of pixels of the image sensor 221 one to one, collect light reflected by the lens unit 155 opposite thereto, and transmit the collected light to the pixels of the image sensor 221 through the optical fibers 222.

The display panel 70, as shown in FIG. 2, includes an upper substrate 60 and a lower substrate 65, and the upper substrate 60 is used as a path along which light emitted from the infrared light emitting elements 110 moves horizontally.

For example, the display panel 70 may be one of various flat display panels, such as a liquid crystal panel, an organic light emitting display panel, an electrophoretic panel, a quantum dot panel, etc. Preferably, a medium of the upper substrate 60 used as the path along which infrared light horizontally moves is glass.

If the display panel 70 is not a light emitting panel, such as a liquid crystal panel, the optical touch input device may include a backlight unit 50. The backlight unit 50 may include a light source, optical sheets and a bottom cover accommodating a support main and the lower portion thereof.

The light receiving unit 120 is located on the infrared light emitting elements 110, and the lens unit 155 has a lens curvature so that light incident through the upper substrate 60 of the display panel 70 from the lower region is turned to be received by the respective in-plane lenses 223 of the light receiving unit 120 at the upper region. In this case, infrared light reflected by the lens unit 155 evenly moves along the surface of the display panel 70.

Further, a case 55 including a case top to cover the light emitting unit 120, the lens unit 155 and a mold structure, such as the backlight unit 50, is provided.

In such an optical touch input device, the display panel 70 functions as both a touch surface and a display surface.

In the above optical touch input device, a touch system to sense touch has a configuration, as follows.

Figure 3:
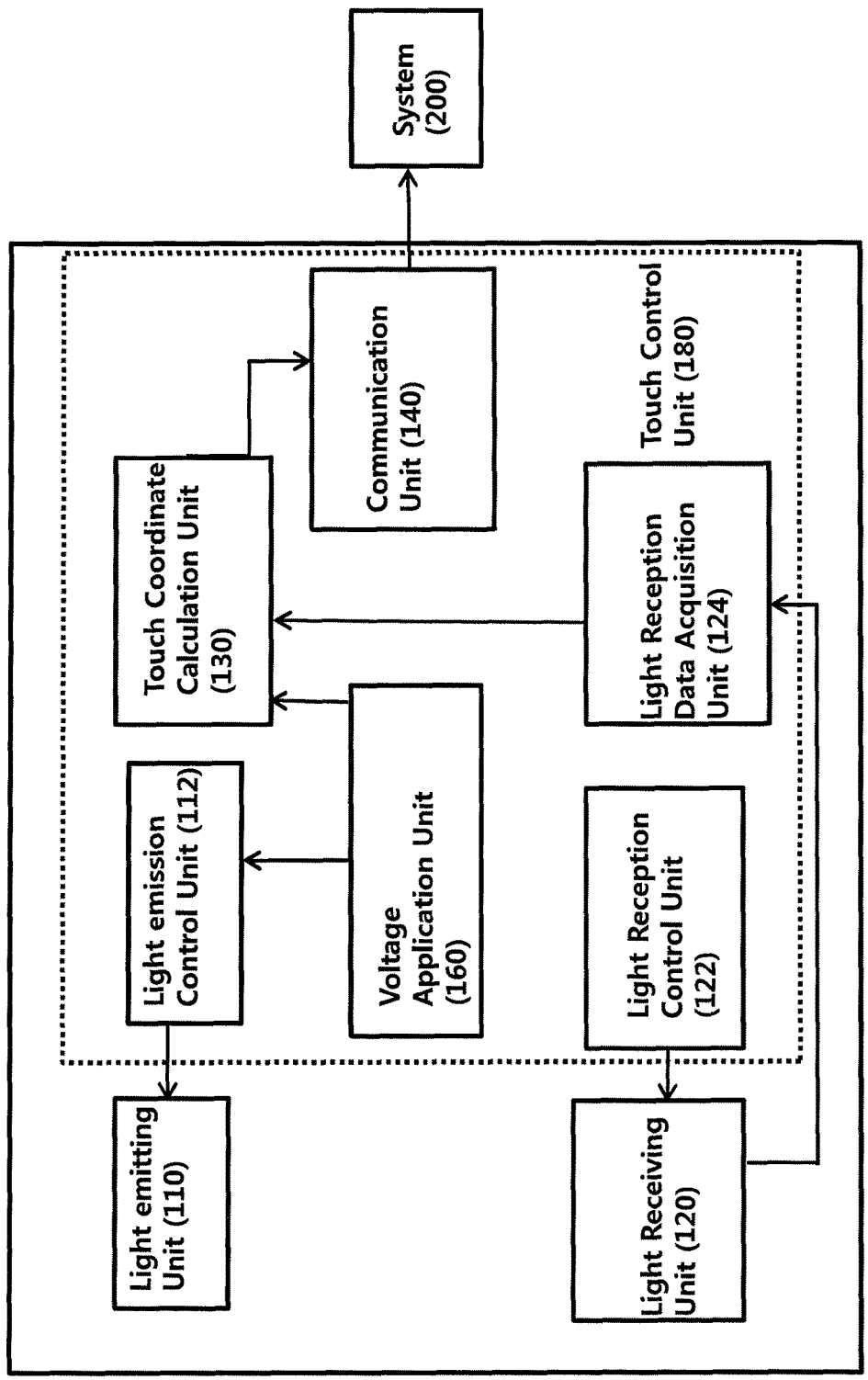
FIG. 3 is a block diagram illustrating a touch system in the optical touch input device in accordance with an embodiment of the present invention.
Figure 4:
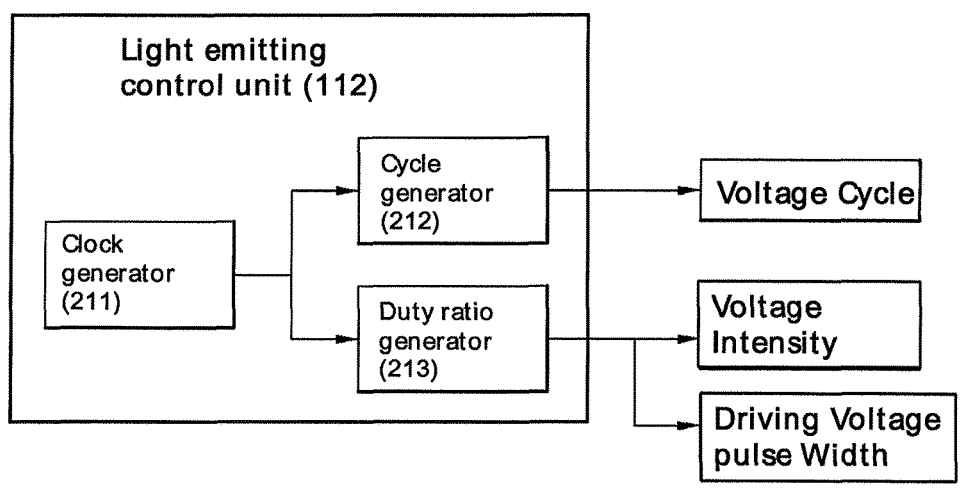
FIG. 4 is a block diagram illustrating internal components of a light emission control unit of FIG. 3 and functions thereof.

FIG. 3 is a block diagram illustrating the touch system in the optical touch input device in accordance with the present invention, and FIG. 4 is a block diagram illustrating internal components of the light emission control unit of FIG. 3 and functions thereof.

As shown in FIG. 3, a touch system 100 generally includes the infrared light emitting elements (hereinafter, referred to as a light emitting unit) 110, the light receiving unit 120, and the touch control unit 180 to control the light emitting unit 110 and the light receiving unit 120. Further, the touch control unit 180 is connected to an external system 200 to generate image data, thus being driven in connection with driving of the display panel.

In this case, the touch control unit 180 may be provided independently of a control unit of the display panel or be provided within the control unit of the display panel.

The touch control unit 180 includes the light emission control unit 112 to control the light emitting unit 110, a light reception control unit 122 to control the light receiving unit 120, a light reception data acquisition unit 124 to receive data regarding light collected by the light receiving unit 120, the touch coordinate calculation unit 130 to calculate a set of coordinates of a touch point according to an amount of the light acquired by the light reception data acquisition unit 124, a voltage application unit 160 to respectively apply power voltages to the light emission control unit 112, the light reception control unit 122 and the touch coordinate calculation unit 130, and a communication unit 140 to transmit the calculated set of coordinates to the external system 200.

Here, the voltage application unit 160 applies corresponding power voltages to the respective components connected thereto. For example, the voltage application unit 160 applies power voltage to respectively turn the infrared light emitting elements on to the light emission control unit 112, and applies power voltage to drive the image sensor to the light reception control unit 122.

The light emission control unit 112, as shown in FIG. 4, includes a clock generator 211, a cycle generator 212 to generate cycles of driving voltage necessary to turn the infrared light emitting elements (the light emitting unit) on in connection with the clock generator 211, and a duty generator 213 to set pulse widths and intensities of the driving voltage in connection with the clock generator 211.

That is, the light emission control unit 122 decreases or increases cycles of driving voltage applied to the respective infrared light emitting elements or pulse widths or intensities of the driving voltage according to during touch and during non-touch. Therethrough, optical output of the respective infrared light emitting elements (the light emitting unit) during non-touch is substantially lowered, thus reducing power consumption necessary to drive of the infrared light emitting elements.

Here, adjustment of the cycles of the driving voltage and the intensities and pulse widths of the driving voltage controlled by the light emission control unit 112 may be executed simultaneously throughout all the infrared light emitting elements, or be executed divisionally on infrared light emitting elements selectively used in touch and infrared light emitting elements not used in touch.

Figure 5:
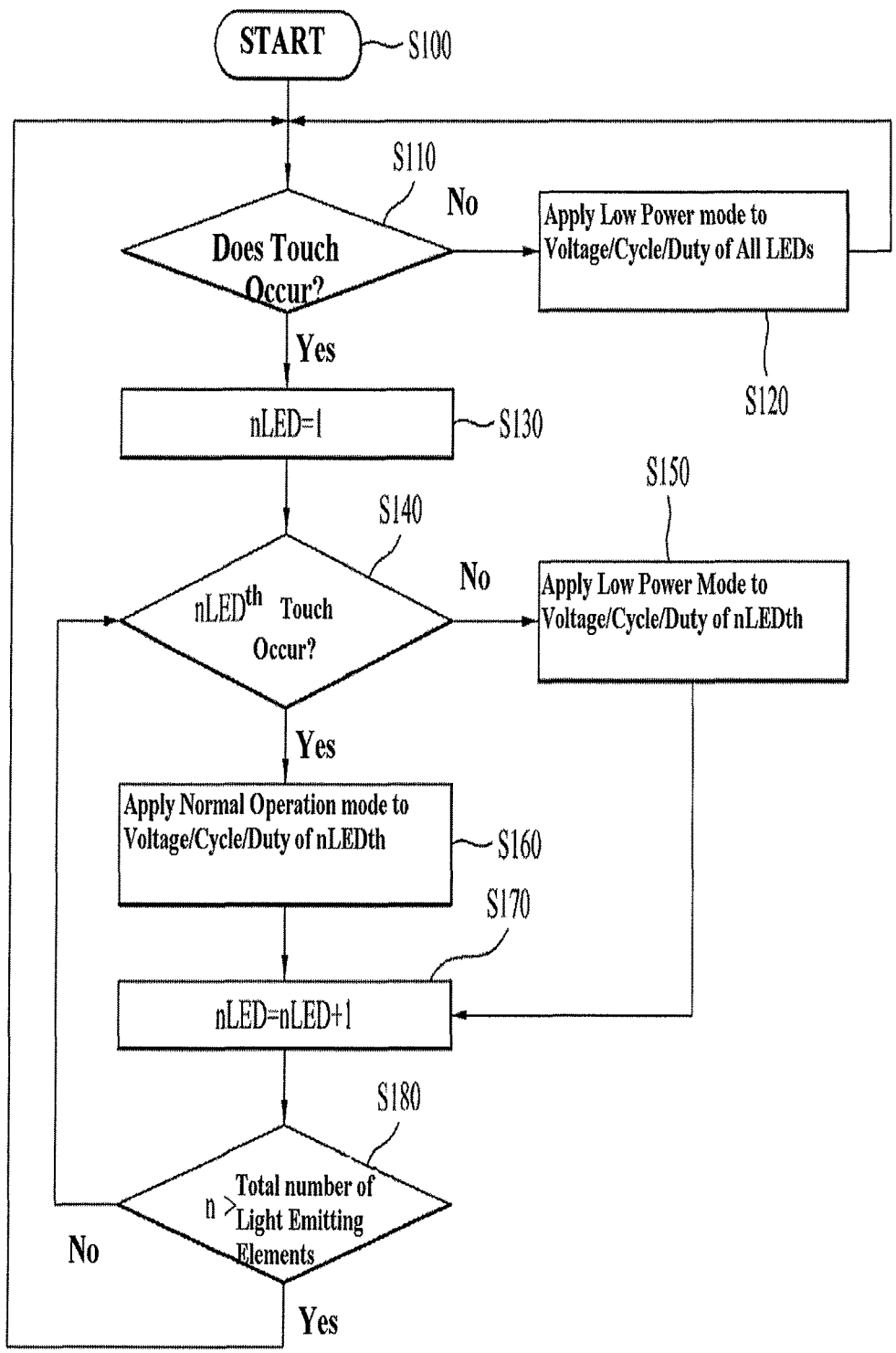
FIG. 5 is a flowchart illustrating a driving method of the optical touch input device in accordance with an embodiment of the present invention.

FIG. 5 is a flowchart illustrating a driving method of the optical touch input device in accordance with the present invention.

As shown in FIG. 5, after driving of the optical touch input device is started (step S100), whether or not touch occurs is detected (step S110). Here, if no touch is detected, all of the plural infrared light emitting elements provided on the two adjacent sides of the display panel are switched to a low power mode in which optical output is lowered (step S120).

On the other hand, if touch is detected in step S110, whether or not touch occurs is judged in regard to the infrared light emitting elements sequentially from the first infrared light emitting element (step S140). Here, if it is judged that an $n^{th}$ infrared light emitting element is not touched, the corresponding infrared light emitting element is switched to the low power mode (step S150). If it is judged that the $n^{th}$ infrared light emitting element is touched in step S140, a normal operation mode is continuously applied to the corresponding infrared light emitting element (step S160).

Thereafter, the next infrared light emitting element is selected (step S170), and judgment as to whether or not the next infrared light emitting element is touched (step 140), switching of the next infrared light emitting element to the low power mode (step S150), and continuous application of the normal operation mode to the next infrared light emitting element (step S160) are repeated until n reaches the total number of the infrared light emitting elements (step S180).

After detection of the final infrared light emitting element has been completed, the method returns to step S100, and thus whether or not touch occurs is judged sequentially from the first infrared light emitting element.

In the optical touch input device in accordance with the present invention, application of voltage to the infrared light emitting elements is divided into the low power mode and the normal operation mode. If it is judged that touch occurs, the normal operation mode in which normal driving voltage is applied is applied to the infrared light emitting element, and if it is judged that touch does not occur, the low power mode in which optical output of the infrared light emitting element is lowered is applied to the infrared light emitting element.

Here, in order to lower optical output, a method of delaying the cycle of the driving voltage applied to the infrared light emitting element or a method of shortening the pulse width of the driving voltage applied once to the infrared light emitting element or lowering the value of the driving voltage is used.

Further, adjustment of the driving voltage may be equally executed in the low power mode or the normal operation mode in regard to all infrared light emitting elements through one-time judgment as to whether or not touch occurs by carrying out only step S110 and step S120. Further, the modes of the infrared light emitting elements may be individually determined through judgment as to whether or not the respective infrared light emitting elements are touched, as shown in FIG. 5.

Hereinafter, a method of adjusting optical output of the infrared light emitting elements will be described in detail.

Figure 6A:
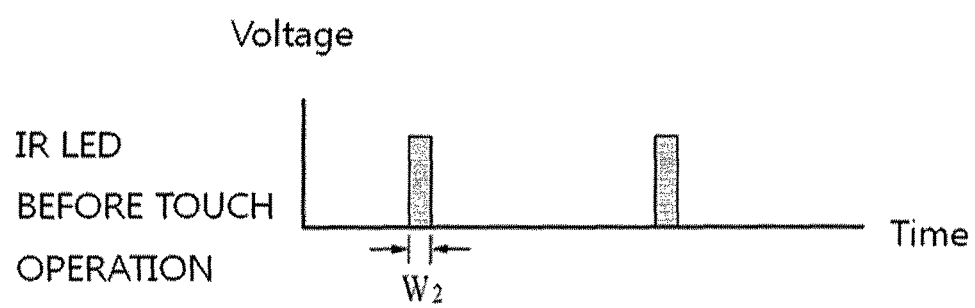
FIGS. 6a and 6b are timing diagrams illustrating a driving method of an optical touch input device in accordance with a first embodiment of the present invention before and after a touch operation.
Figure 6B:
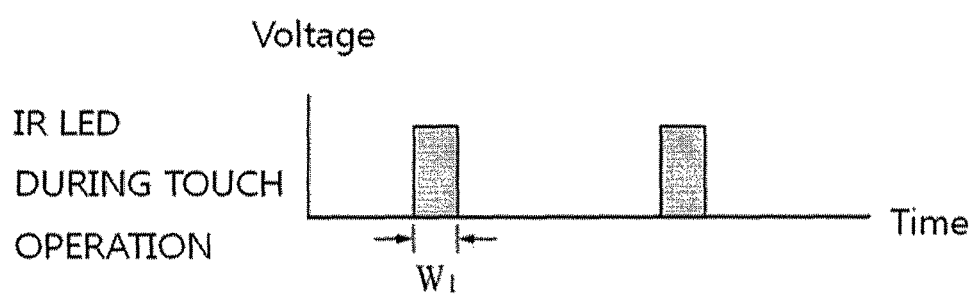

FIGS. 6a and 6b are timing diagrams illustrating a driving method of an optical touch input device in accordance with a first embodiment of the present invention before and after a touch operation.

The driving method of the optical touch input device in accordance with the first embodiment of the present invention is implemented such that the infrared light emitting element is operated in the low power mode during non-touch by adjusting the pulse width of the driving voltage applied to the infrared light emitting element.

That is, by varying driving of an infrared light emitting element having a regular pulse duty, as shown in FIG. 6b, the driving voltage maintains the minimum pulse width $w_2$ to sense touch before touch, as shown in FIG. 6a, and then has an increased pulse width $w_1$ at a point of time when touch occurs to smoothly execute the touch operation, as shown in FIG. 6b, thereby reducing power consumption generated before the touch operation.

Figure 7A:
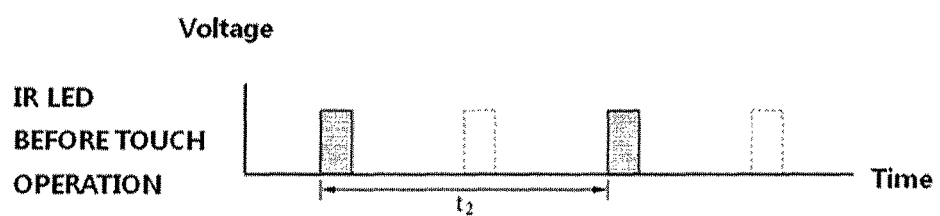
FIGS. 7a and 7b are timing diagrams illustrating a driving method of an optical touch input device in accordance with a second embodiment of the present invention before and after a touch operation.
Figure 7B:
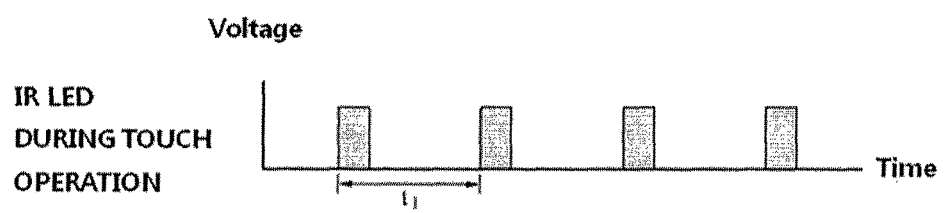

FIGS. 7a and 7b are timing diagrams illustrating a driving method of an optical touch input device in accordance with a second embodiment of the present invention before and after a touch operation.

The driving method of the optical touch input device in accordance with the second embodiment of the present invention is implemented such that the infrared light emitting element is operated in the low power mode during non-touch by adjusting the application cycle of the driving voltage applied to the infrared light emitting element.

That is, the driving voltage maintains a long application cycle $t_2$ before touch, as shown in FIG. 7a, and has a short application cycle $t_1$ at a point which is touched to smoothly execute the touch operation, as shown in FIG. 7b, thereby reducing power consumption generated before the touch operation.

Figure 8A:
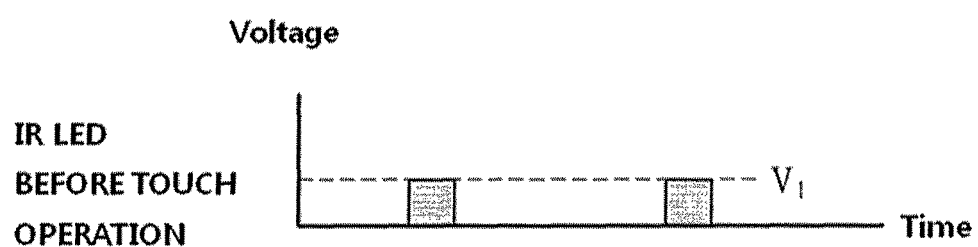
FIGS. 8a and 8b are timing diagrams illustrating a driving method of an optical touch input device in accordance with a third embodiment of the present invention before and after a touch operation.
Figure 8B:
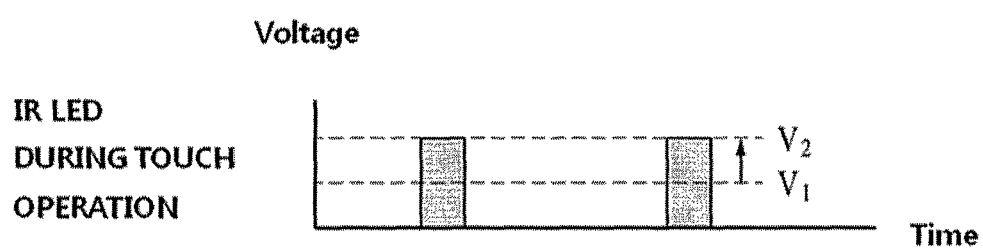

FIGS. 8a and 8b are timing diagrams illustrating a driving method of an optical touch input device in accordance with a third embodiment of the present invention before and after a touch operation.

The driving method of the optical touch input device in accordance with the third embodiment of the present invention is implemented such that the infrared light emitting element is operated in the low power mode during non-touch by adjusting the intensity of the driving voltage applied to the infrared light emitting element.

That is, the driving voltage of the infrared light emitting element is decreased to an intensity $V_1$ before touch, as shown in FIG. 8a, and is increased to an intensity $V_2$ to smoothly execute the touch operation when touch occurs, as shown in FIG. 8b, thereby reducing power consumption generated before the touch operation.

The above-described methods in accordance with the first to third embodiments may be independently applied, or two or three of the methods may be used together.

Figure 9:
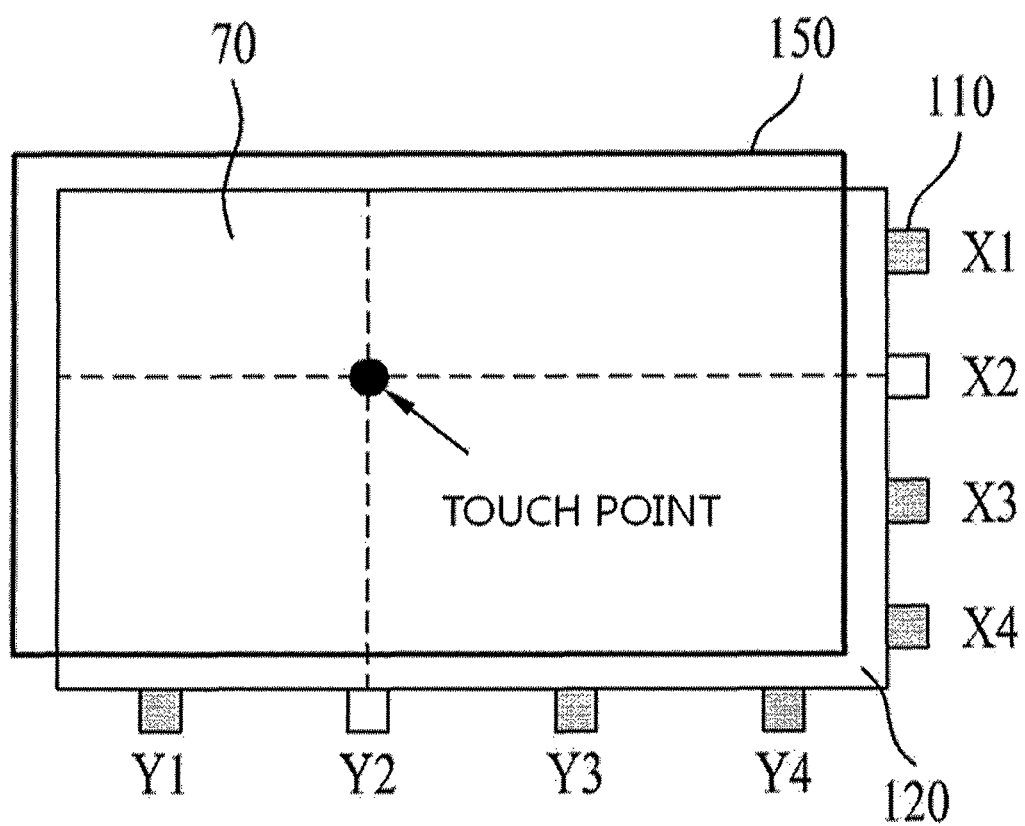
FIG. 9 is a view illustrating divisional driving of infrared light emitting elements used in touch and the remaining infrared light emitting elements based on a driving method of an optical touch input device in accordance with a fourth embodiment of the present invention.
Figure 10:
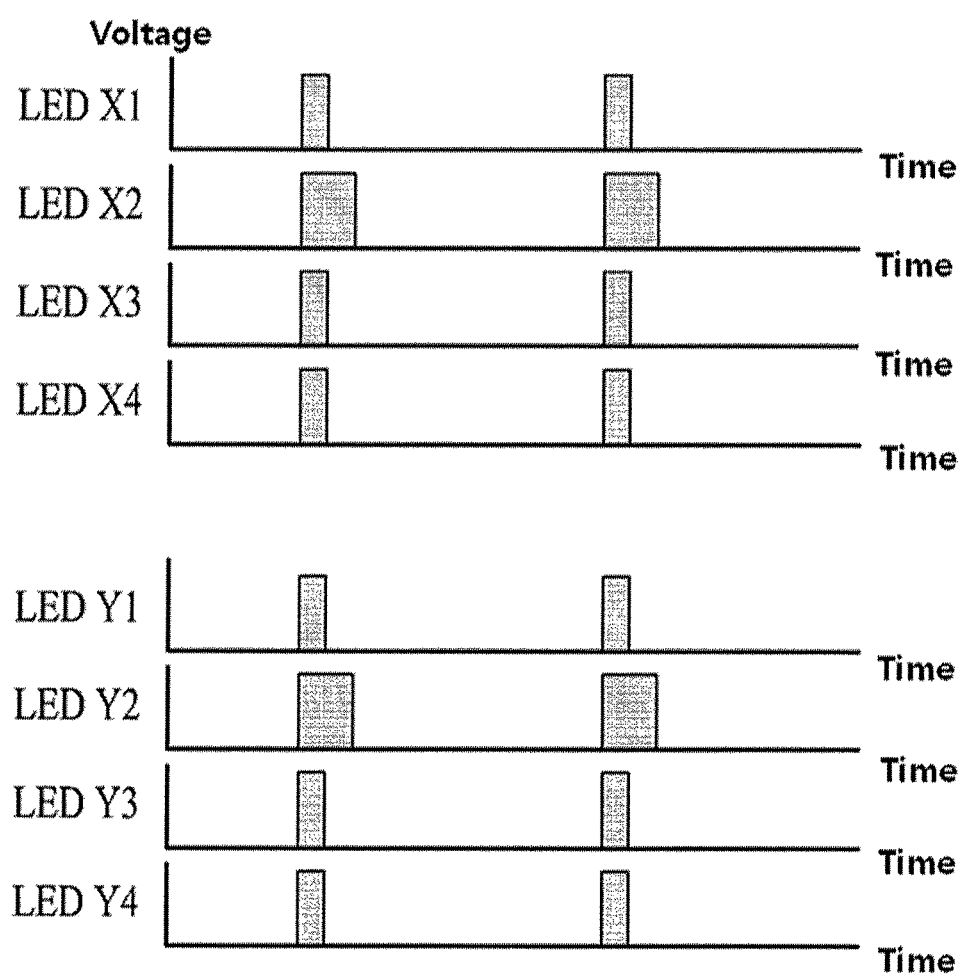
FIG. 10 is a timing diagram illustrating application of driving voltage to the respective infrared light emitting elements of FIG. 9.

FIG. 9 is a view illustrating divisional driving of infrared light emitting elements used in touch and the remaining infrared light emitting elements based on a driving method of an optical touch input device in accordance with a fourth embodiment of the present invention, and FIG. 10 is a timing diagram illustrating application of driving voltage to the respective infrared light emitting elements of FIG. 9.

The driving method of the optical touch input device in accordance with the fourth embodiment of the present invention is implemented such that infrared light emitting elements are divided into infrared light emitting elements used in touch and infrared light emitting elements not used in touch, driving voltage in the normal operation mode is applied to the infrared light emitting elements used in touch, and driving voltage in the low power mode is applied to the infrared light emitting elements not used in touch.

For example, when a touch point is located at the intersection between a second light emitting element X2 of the X axis and a second light emitting element Y2 of the Y axis, as shown in FIG. 9, driving voltage in the normal operation mode is applied only to the light emitting elements X2 and Y2 corresponding to the touch point, and driving voltage in the low power mode is applied to the remaining light emitting elements X1, X3, X4, Y1, Y3 and Y4, as shown in FIG. 10.

In this case, in order to divisionally apply driving voltage, instead of the method of adjusting the pulse width, as shown in FIG. 10, the method of adjusting the cycle of the driving voltage or the method of adjusting the intensity of the driving voltage may be used.

In FIG. 9, non-described reference numeral 150 means the lens unit 155 of FIG. 1 including the plural lenses.

Figure 11:
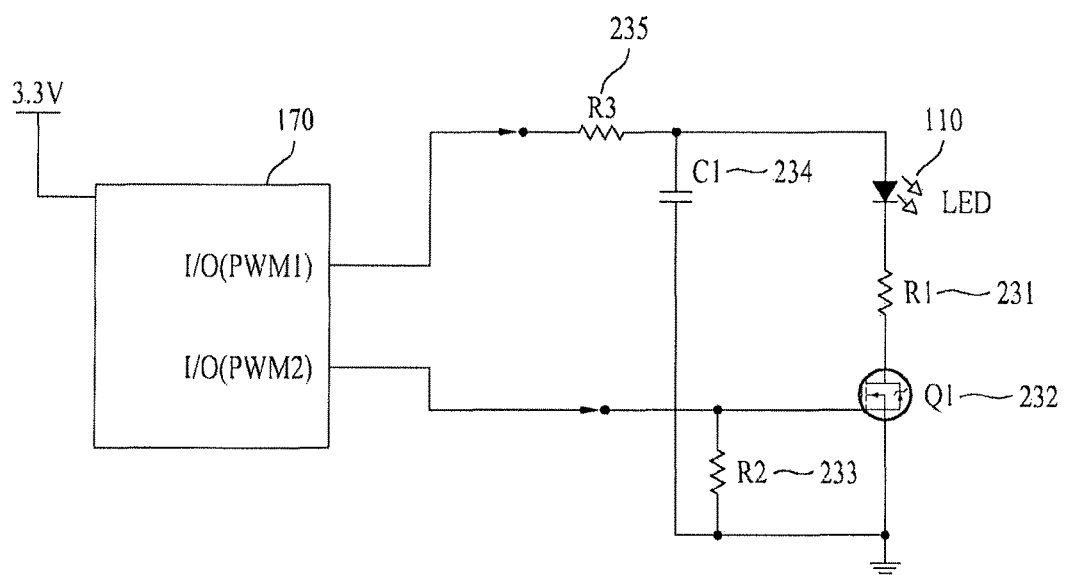
FIG. 11 is a circuit diagram illustrating a circuit of the light emission control unit of the optical touch input device in accordance with an embodiment of the present invention.

FIG. 11 is a circuit diagram illustrating a circuit of the light emission control unit of the optical touch input device in accordance with the present invention.

FIG. 11 exemplarily illustrates a circuit configuration of the light emitting control unit, and Table 1 below states test values representing consumed current and consumed power generated according to selective application of input signals PWM1 and PWM2 within a mode switching unit 170 in the circuit.

Here, the light emission control unit includes the mode switching unit 170, a switching element Q1 232 connected to an output terminal of the second input signal PWM2 of the mode switching unit 170 and a control terminal (a base terminal), a first resistor R1 231 provided between the switching element Q1 232 and the infrared light emitting element 110, a second resistor R2 233 provided between the control terminal of the switching element 232 and a ground terminal, and a third resistor R3 235 provided between the infrared light emitting element 110 and an output terminal of the first input signal PWM1 of the mode switching unit 170.

Here, a capacitor C1 is provided between a node between the third resistor R3 235 and the infrared light emitting element 110 and the ground terminal, thereby charging current applied to the infrared light emitting element 110.

For example, the switching element 23 is a bipolar transistor including a control terminal (a base terminal), a collector terminal and an emitter terminal, the collector terminal is connected to the ground terminal, the emitter terminal is connected to the first resistor R1 231, and the control terminal is connected to the second resistor R2 233 and the output terminal of the second input signal PWM2 of the mode switching unit 170.

Further, the infrared light emitting element 110 is connected from the output terminal of the first input signal PWM1 of the mode switching unit 170 to the switching element 232 in the forward direction.

Here, the first input signal PWM1 of the mode switching unit 170 is a signal to control the driving voltage of the infrared light emitting element 110, and the second input signal PWM2 of the mode switching unit 170 is a signal to change the pulse width and the cycle of the driving voltage applied to the infrared light emitting element 110 through the switching element 232.

TABLE 1

|  | Change of voltage value (adjustment of PWM1) (70 Hz, 2 ms) | | Change of applied PWM duty (adjustment of PWM2) (3.3 V, 70 Hz) | | Changed of applied PWM cycle (adjustment of PWM2) (3.3 V, 2 ms) | |
| --- | --- | --- | --- | --- | --- | --- |
| division | 3.3 V | 2.5 V | 20% | 14.3% | 90 Hz | 70 Hz |
| Consumed current | 81 mA | 60 mA | 92 mA | 81 mA | 102 mA | 81 mA |
| Consumed power | 267.3 mW | 155 mW | 316.8 mW | 267.3 mW | 336.6 mW | 267.3 mW |

With reference to Table 1, it is verified that consumed current and consumed power are reduced when driving voltage is lowered from 3.3V to 2.5V, consumed current and consumed power are reduced when the range of the pulse width of the driving voltage is lowered from 20% to 14.3%, and consumed current and consumed power are reduced when the cycle of the driving voltage is decreased from 90 Hz to 70 Hz.

Such a circuit configuration of the light emission control unit is not limited to the shown circuit, and the number and/or disposition of resistors and capacitors may be varied as needed. Further, driving voltage values, pulse widths of driving voltage or cycles of driving voltage stated in Table 1 represent only one example, and may be changed based on circumstances. In any case, optical output of an infrared light emitting element in the low power mode may be lowered, as compared to an infrared light emitting element in the normal operation mode.

In the driving method in accordance with the present invention, the minimum requirement necessary for touch recognition is set by minimizing duty and voltage of light emitting elements or increasing a light emission cycle of the light emitting elements before touch occurs, to minimize power consumption before touch, and the light source of the light emitting elements are normally driven while touch occurs to smoothly execute a touch operation. Further, in the driving method in accordance with the present invention, the pulse width, cycle, and intensity of driving voltage are adjusted so that light emitting elements corresponding to a region in which touch is substantially recognized and the sensor are normally driven while touch occurs and the other emitting elements corresponding to other regions satisfy the minimum requirement necessary for touch recognition, thereby reducing power consumption of the light emitting elements.

As is apparent from the above description, an optical touch input device and a driving method thereof in accordance with the present invention has effects, as follows.

In the optical touch input device, power consumption of light emitting elements is minimized before touch is initially recognized, and is controlled according to a touch region during a touch operation, thereby reducing total power consumption while exhibiting the same touch sensing function as continuous application of driving voltage.

Further, the lifespan of the light emitting elements is improved due to reduction of power consumption.

It will be apparent to those skilled in the art that various modified embodiments and variations can be made in the present invention without departing from the spirit or scope of the inventions. Thus, it is intended that the present invention covers the modified embodiments and variations of this invention provided they come within the scope of the appended claims and their equivalents.

What is claimed is:

1. An optical touch input device, comprising:
a display panel;
a plurality of infrared (IR) light elements disposed on two adjacent sides of the display panel, the plurality of IR light elements configured to emit IR light signals in response to driving voltage signals being applied to the plurality of IR light elements;
a lens unit disposed on another two adjacent sides of the display panel, the lens unit configured to reflect the IR light signals emitted from the plurality of IR light elements;
a light receiving unit disposed on the two adjacent sides of the display panel, the light receiving unit configured to receive the IR light signals reflected from the lens unit; and
a touch control unit configured to:
  determine whether or not a touch has occurred on the display panel based on the IR light signals received by the light receiving unit;
  set, in response to determining that no touch has occurred, all of the plurality of IR light elements to a low power mode by applying low power driving voltage signals to all of the plurality of IR light elements, the low power driving voltage signals including pulses having a first non-zero voltage level, the touch control unit being configured to determine whether or not the touch has occurred while all of the plurality of IR light elements are set to the low power mode;
  determine, in response to determining that a touch has occurred, which of the plurality of IR light elements emit an IR light signal that intersect a touch point of the touch; and
  in response to determining which of the plurality of IR light elements emit an IR light signal that intersect the touch point, set IR light elements of the plurality of IR light elements determined to emit an IR light signal that intersect the touch point to a normal power mode by applying normal power driving voltage signals to the IR light elements of the plurality of IR light elements determined to emit an IR light signal that intersect the touch point, and set remaining IR light elements of the plurality of IR light elements to the low power mode by applying the low power driving voltage signals to the remaining IR light elements, the normal power driving voltage signals including pulses having a second non-zero voltage level that is greater than the first non-zero voltage level.

2. The optical touch input device of claim 1, further comprising:
a light emission control unit including:
  a clock generator;
  a cycle generator configured to generate the pulses of the low power driving voltage signals and the normal power driving voltage signals using the clock generator; and
  a duty ratio generator configured to set pulse widths and intensities of the pulses of the low power driving voltage signals and the normal power driving voltage signals using the clock generator.

3. An optical touch input device, comprising:
a display panel;
a plurality of infrared (IR) light emitting elements disposed on two adjacent sides of the display panel, the plurality of IR light emitting elements configured to emit IR light signals in response to driving voltage signals being applied to the plurality of IR light emitting elements;
a lens unit disposed on another two adjacent sides of the display panel, the lens unit configured to reflect the IR light signals emitted from the plurality of IR light emitting elements;
a light receiving unit disposed on the two adjacent sides of the display panel, the light receiving unit configured to receive the IR light signals reflected from the lens unit; and
a touch control unit configured to:
  determine whether or not a touch has occurred on the display panel based on the IR light signals received by the light receiving unit;
  set, in response to determining that no touch has occurred, all of the IR light emitting elements to a low power mode by applying low power driving voltage signals to all of the IR light emitting elements, the low power driving voltage signals including pulses having a first non-zero voltage level and a first time period between pulses;
  determine, in response to determining that a touch has occurred, which of the plurality of IR light emitting elements emit an IR light signal that intersect a touch point of the touch;
  set IR light emitting elements determined to emit an IR light signal that intersect the touch point to a normal power mode by applying normal power driving voltage signals to the IR light emitting elements determined to emit an IR light signal that intersect the touch point, the normal power driving voltage signals including pulses having a second non-zero voltage level and a second time period between pulses, the second time period being shorter than the first time period; and
  set IR light emitting elements determined to not emit an IR light signal that intersect the touch point to the low power mode by applying the low power driving voltage signals to the IR light emitting elements determined to not emit an IR light signal that intersect the touch point a light emission control unit including:
  a mode switching unit configured to output first and second input signals from first and second output terminals, respectively, to generate the low power driving voltage signals and the normal power driving voltage signals; and
  a switching element electrically coupled to the plurality of IR light emitting elements, the switching element having a control terminal,
  the first output terminal being electrically coupled to the plurality of IR light emitting elements,
  the second output terminal being electrically coupled to the control terminal,
  the first input signal controls voltage levels of the low power driving voltage signals and the normal power driving voltage signals,
  the second input signal controls pulse widths and cycles of the low power driving voltage signals and the normal power driving voltage signals through selection of the mode switching unit.

4. The optical touch input device according to claim 3 wherein the light receiving unit includes:
  an image sensor;
  a plurality of optical fibers, each of the plurality of optical fibers including a first end coupled to the image sensor;
  a plurality of in-plane lenses, each of the plurality of optical fibers including a second end coupled to the plurality of in-plane lenses; and
  an optical waveguide in which the image sensor, the plurality of optical fibers and the plurality of in-plane lenses are installed.

5. A driving method of an optical touch input device, comprising:
  emitting, by a plurality of infrared (IR) light elements, a plurality of IR light signals, the plurality of IR light elements being disposed on two adjacent sides of a display panel;
  receiving, by a light receiving unit, the plurality of IR light signals;
  determining, by a touch control unit, whether or not a touch has occurred with respect to the display panel based on the plurality of IR light signals received;
  in response to determining that no touch has occurred, setting, by the touch control unit, all of the plurality of IR light elements to a low power mode by applying low power driving voltage signals to all of the plurality of IR light elements, the low power driving voltage signals including pulses having a first non-zero voltage level, the touch control unit being configured to determine whether or not the touch has occurred while all of the plurality of IR light elements are set to the low power mode;
  in response to determining that a touch has occurred, determining, by the touch control unit, which of the plurality of IR light elements emit an IR light signal that intersect a touch point of the touch; and
  in response to determining which of the plurality of IR light elements emit an IR light signal that intersect the touch point, setting, by the touch control unit, IR light elements determined to emit an IR light signal that intersect the touch point to a normal power mode by applying normal power driving voltage signals to the IR light elements of the plurality of IR light elements determined to emit an IR light signal that intersects the touch point, and setting, by the touch control unit, remaining IR light elements of the plurality of IR light elements to the low power mode by applying the low power driving voltage signals to the remaining IR light elements, the normal power driving voltage signals including pulses having a second non-zero voltage level, the low power driving voltage signals having a lower power than the normal power driving voltage signals.

6. The driving method according to claim 5 wherein the pulses of the low power driving voltage signals have a first time period between pulses, the pulses of the normal power driving voltage signals have a second time period between pulses, and the second time period is shorter than the first time period.

7. The driving method according to claim 5 wherein each of the pulses of the low power driving voltage signals has a first pulse width, each of the pulses of the normal power driving voltage signals has a second pulse width, and the second pulse width is greater than the first pulse width.

8. The driving method according to claim 5 wherein the first non-zero voltage level is lower than the second non-zero voltage level.

9. An apparatus, comprising:
  a display panel;
  a plurality of infrared (IR) light emitters configured to emit a plurality of IR light signals in response to a plurality of driving voltage signals being applied to the plurality of IR light emitters;
  a light receiving unit configured to receive the IR light signals emitted from the plurality of IR light emitting elements; and
  a controller including:
    a mode switching unit configured to output first and second input signals from first and second output terminals, respectively, to generate low power driving voltage signals and normal power driving voltage signals; and
    a switching element electrically coupled to the plurality of IR light emitters, the switching element having a control terminal, the first output terminal being electrically coupled to the plurality of IR light emitters, the second output terminal being electrically coupled to the control terminal of the switching element,
  the controller configured to:
    determine whether or not a touch has occurred on the display panel based on the IR light signals received by the light receiving unit;
    set, in response to determining that no touch has occurred, all of the IR light emitting elements to a low power mode by applying the low power driving voltage signals to all of the IR light emitting elements, the low power driving voltage signals including pulses having a first non-zero voltage level and a first pulse width;
    determine, in response to determining that a touch has occurred, which of the plurality of IR light emitting elements emit an IR light signal that intersect a touch point of the touch;
    set IR light emitting elements determined to emit an IR light signal that intersect the touch point to a normal power mode by applying the normal power driving voltage signals to the IR light emitting elements determined to emit an IR light signal that intersect the touch point, the normal power driving voltage signals including pulses having a second non-zero voltage level and a second pulse width, the second pulse width being greater than the first pulse width; and set IR light emitting elements determined to not emit an IR light signal that intersect the touch point to the low power mode by applying the low power driving voltage signals to the IR light emitting elements determined to not emit an IR light signal that intersect the touch point.

10. The apparatus of claim 9 wherein the controller is configured to determine whether or not the touch has occurred while all of the plurality of IR light emitting elements are set to the low power mode.

* * * * *